(12) United States Patent
Kim (10) Patent No.: US 12,011,120 B2
(45) Date of Patent: Jun. 18, 2024

(54) EASILY FOLDABLE ROTARY STAND USED AS POT HANDLE

(71) Applicant: Young Soo Kim, Busan (KR)

(72) Inventor: Young Soo Kim, Busan (KR)

( * ) Notice: Subject to any disclaimer, the term of this patent is extended or adjusted under 35 U.S.C. 154(b) by 335 days.

(21) Appl. No.: 17/433,967

(22) PCT Filed: Feb. 13, 2020

(86) PCT No.: PCT/KR2020/002050
§ 371 (c)(1),
(2) Date: Aug. 25, 2021

(87) PCT Pub. No.: WO2020/175820
PCT Pub. Date: Sep. 3, 2020

(65) Prior Publication Data
US 2022/0160179 A1    May 26, 2022

(30) Foreign Application Priority Data

Feb. 26, 2019 (KR) ........................ 20-2019-0000812

(51) Int. Cl.
*A47J 45/07* (2006.01)
*A47J 45/06* (2006.01)
*A47J 47/16* (2006.01)

(52) U.S. Cl.
CPC ............... *A47J 47/16* (2013.01); *A47J 45/06* (2013.01)

(58) Field of Classification Search
CPC ........... A47J 47/16; A47J 45/06; A47J 45/00; A47J 45/07; A47J 45/072; A47J 45/061; A47J 45/062; A47J 36/34; A47J 27/00

USPC .............. 220/756; 248/145.6, 688; 294/27.1; 16/425
See application file for complete search history.

(56) References Cited

U.S. PATENT DOCUMENTS 2,547,844 A * 4/1951 Wickland .............. A47J 45/072
248/688
3,010,688 A * 11/1961 Serio ..................... A47J 45/072
248/688

(Continued)

FOREIGN PATENT DOCUMENTS

KR     20-0230536 Y1    7/2001
KR     10-0923419 B1    10/2009

(Continued)

OTHER PUBLICATIONS

KR Decision to Grant dated May 1, 2019 as received in Application No. 20-2019-0000812.

*Primary Examiner* — John K Fristoe, Jr.
*Assistant Examiner* — Elizabeth J Volz
(74) *Attorney, Agent, or Firm* — Maschoff Brennan (57) ABSTRACT

A single button allows a pot handle to be used as a pot stand, and thus there is no need for a separate additional component or handle. Even when a pot handle is used, a portion used in a folded state is protected by a holding projection and a protruding cover. In addition, a portion connected to a pot is spaced a certain distance from the pot, thus minimizing the amount of heat conducted when cooking food. A lateral movement prevention member is provided at the outer diameter of the bottom surface of a fixing piece and minimizes the lateral movement of the pot handle when the pot handle is used as the stand, and thus the pot handle can be safely used as the stand.

1 Claim, 11 Drawing Sheets

(56) References Cited

U.S. PATENT DOCUMENTS

| | | | | |
|---|---|---|---|---|
| 5,179,932 A * | 1/1993 | DeCarlo | ............. | A47J 37/0763 |
| | | | | 99/449 |
| 6,067,698 A * | 5/2000 | Silvera-Langley | ..... | A47J 36/34 |
| | | | | 220/9.4 |
| 6,494,340 B1 * | 12/2002 | Joo | .......................... | B65D 7/20 |
| | | | | 220/756 |

FOREIGN PATENT DOCUMENTS

| KR | 10-1416969 B1 | 7/2014 |
|---|---|---|
| KR | 10-2018-0096886 A | 8/2018 |
| KR | 20-0489172 Y1 | 5/2019 |

* cited by examiner

EASILY FOLDABLE ROTARY STAND USED AS POT HANDLE

TECHNICAL FIELD

The present invention relates to a stand used as a pot handle, and more specifically, to a pot stand in which a pot handle is easily folded by using a one-touch button.

BACKGROUND ART

In general, a pot used to cook or heat food has handles on both sides, or one side thereof so that a person can easily grip and move the pot as the pot is used by directly applying the fire to the pot. When food has been cooked and it is ready to eat, a pot stand is necessarily required. In this case, if there is a pot stand nearby, persons can eat the food by placing the pot on the pot stand, but if there is no pot stand nearby, persons may put the pot on a thick book or flat cardboard to eat the food, which is unsanitary and persons may be damaged by hot food.

In order to solve the above problem, Korean Utility Model Registration No. 20-0230536 discloses "a pot equipped with stand", which includes fixing members attached to an outer wall of a pot so as to face each other and formed at a center portion thereof with a bolt hole, a rotary member located at a front of the fixing member, assembled to the fixing member through a shaft, and making contact with the fixing member so as to be able to stop and rotate, and a stopper device provided on the fixing member and the rotary member.

DISCLOSURE

Technical Problem

In the case of the above related art, a stand is rotated by the fixing members attached to the pot and the stopper device provided on the rotary member, however, there is a problem that a separate handle is provided so that the stand cannot be used through one operation. In addition, there is a case in which a separate handle is attached such that the handle can be used as a stand. However, in order to use the stand handle, it is necessary to rotate the stand handle downward after placing the pot on another place, which causes inconvenience of use. In addition, since the handle and the stand are simply coupled to each other by using a bolt and a washer, there is a problem in durability and stability when used as a stand because the stand handle is shaken left and right.

Technical Solution

An easily foldable rotary includes:

a body provided at a lower portion thereof with an oval part having a first through hole, in which an inclined part and a holding part are provided at an upper portion of the oval part, so the body is rotated without being interfered with a holding projection due to the inclined part, the holding part comes into surface-contact with a distal end of the holding projection so that the holding part is firmly fixed when used as a pot handle, a second through hole is provided inside the holding part, an extension part protrudes inward at an upper portion of the body to form a first space part, a fixing piece is provided at a distal end of the extension part, and a lateral movement preventing member is formed on an outer diameter portion of a bottom surface of the fixing piece;

a rotary member with a shaft part having a surface-contact part and passing through a center of the rotary member to be exposed, in which a front bending part is formed on a front part of the shaft part, a button is formed to protrude vertically from an upper portion of the rotary member, a stopper is provided at a lower portion of the rotary member, a bottom bending part is formed on a rear surface of the stopper, [9] a rear bending part narrowing downward is formed on a rear surface of the front bending part, a holding groove is formed at a center of the rear bending part, and a fixing groove is integrally formed at a lower portion of the rotary member; and a fixing member having a first elastic member with a middle portion held in the holding groove of the rotary member, in which a distal end of the first elastic member is held inside the extension part of the body, a second elastic member is fixed to the fixing groove of the rotary member and the fixing piece provided at the distal end of the extension part, so that the fixing member rotates about the shaft part when the button of the rotary member is pressed and the fixing member returns to an original position when the button is not pressed, a holding hole is formed at a center of the fixing member, cylindrical parts having an interior space wider than a diameter of the holding hole are provided at both sides of the fixing member, an upper engagement groove and a lower engagement groove are formed on an upper surface and a lower part of the cylindrical part, respectively, protruding covers protrude from both sides of the fixing member, and a first washer, a third elastic member, and a second washer are sequentially held in the interior space, wherein a holding projection having a second space is formed on an upper portion of the fixing member, the fixing member and the holding projection are integrally or separately formed and detachably attached to upper left and right portions of the pot, and the second washer of the fixing member is fixed by a fixing device after making surface-contact with the first through hole of the body.

Advantageous Effects

According to the present invention, a single button allows a pot handle to be used as a pot stand, and thus there is no need for a separate additional component or handle. When the pot handle is used as a pot stand by folding the pot handle, a protruding cover is provided to minimize food broth or debris from entering during use. Even when it is used as a pot handle, a portion used in a folded state is protected by a holding projection and a protruding cover, thereby improving product durability. In addition, a portion connected to the pot is spaced by a certain distance from the pot, thus minimizing the amount of heat conducted when cooking food, so that the pot handle and the pot stand can be safely used. In addition, a lateral movement prevention member is provided at the outer diameter of the bottom surface of a fixing piece formed in the body so that the lateral movement of the pot handle can be minimized when the pot handle is used as the stand, and thus the pot handle can be safely used as the stand. Further, the pot handle can be spaced by a certain distance from the pot, thus minimizing the thermal conductivity of the pot to prevent injuries such as burns.

BEST MODE

Mode for Invention

Hereinafter, preferred embodiments of the present invention will be described in detail with reference to the accompanying drawings. When reference numerals are given to the elements of the drawings, it should be noted that the same reference numerals are used to designate the same or similar elements even when they are shown in different drawings. Further, in the description of the present invention, when it is determined that the detailed description about the known configuration or function may make the subject manner of the present invention rather unclear, the description thereof will be omitted.

In the description of the present invention, the terms will be defined in consideration of the functions thereof in the present invention, which may vary according to the intention or custom of those skilled in the art, so the definitions should be determined based on the contents of the specification.

An easily foldable rotary includes:

a body 20 and 20' provided at a lower portion thereof with an oval part 22 and 22' having a first through hole 21 and 21', in which an inclined part 23 and 23' and a holding part 24 and 24' are provided at an upper portion of the oval part 22 and 22', so the body 20 and 20' is rotated without being interfered with a holding projection 80 due to the inclined part 23 and 23', the holding part 24 and 24' comes into surface-contact with a distal end of the holding projection 80 so that the holding part 24 and 24' is firmly fixed when used as a pot handle, a second through hole 25 and 25' is provided inside the holding part 24 and 24', an extension part 28 and 28' protrudes inward at an upper portion of the body 20 and 20' to form a first space part 29 and 29', a fixing piece 28-1 is provided at a distal end of the extension part 28 and 28', and a lateral movement preventing member 90 is formed on an outer diameter portion of a bottom surface of the fixing piece 28-1;

a rotary member 30 with a shaft part 31 having a surface-contact part 31-1 and passing through a center of the rotary member 30 to be exposed, in which a front bending part 32 is formed on a front part of the shaft part 31, a button 33 is formed to protrude vertically from an upper portion of the rotary member 30, a stopper 34 is provided at a lower portion of the rotary member 30, a bottom bending part 35 is formed on a rear surface of the stopper 34, a rear bending part 37 narrowing downward is formed on a rear surface of the front bending part 32, a holding groove 32 is formed at a center of the rear bending part 37, and a fixing groove 39 is integrally formed at a lower portion of the rotary member 30; and a fixing member 40 having a first elastic member 30-1 with a middle portion m held in the holding groove 38 of the rotary member 30, in which a distal end e of the first elastic member 30-1 is held inside the extension part 28 and 28' of the body 20 and 20', a second elastic member 30-2 is fixed to the fixing groove 39 of the rotary member 30 and the fixing piece 28-1 provided at the distal end of the extension part 28 and 28', so that the fixing member 40 rotates about the shaft part when the button of the rotary member is pressed and the fixing member returns to an original position when the button is not pressed, a holding hole 41 is formed at a center of the fixing member 40, cylindrical parts 43 having an interior space wider than a diameter of the holding hole 41 are provided at both sides of the fixing member 40, an upper engagement groove 44 and a lower engagement groove 45 are formed on an upper surface and a lower part of the cylindrical part 43, respectively, protruding covers 46 protrude from both sides of the fixing member 40, and a first washer 47 and 47', a third elastic member 48 and 48', and a second washer 49 and 49' are sequentially held in the interior space 42, wherein a holding projection 80 having a second space 81 is formed on an upper portion of the fixing member 40, the fixing member 40 and the holding projection 80 are integrally or separately formed and detachably attached to upper left and right portions of the pot, and the second washer 49 of the fixing member 40 is fixed by a fixing device 60 after making surface-contact with the first through hole 21 and 21' of the body 20 and 20'.

The present invention having the above structure consists of the body 20 and 20', the rotary member 30, the fixing member 40, the holding projection 80, and a lateral movement prevention member 90.

The fixing member 40 and the holding projection 80 may be integrally or separately formed on the pot 100, and may be detachable from the pot 100 so that they are used by simply attaching them to the existing pot, and the fixing member 40, the holding projection 80, and the lateral movement prevention member 90 may have a structure that directly makes surface-contact with the pot so that they are formed of a metal material with low thermal conductivity.

Figure 1:
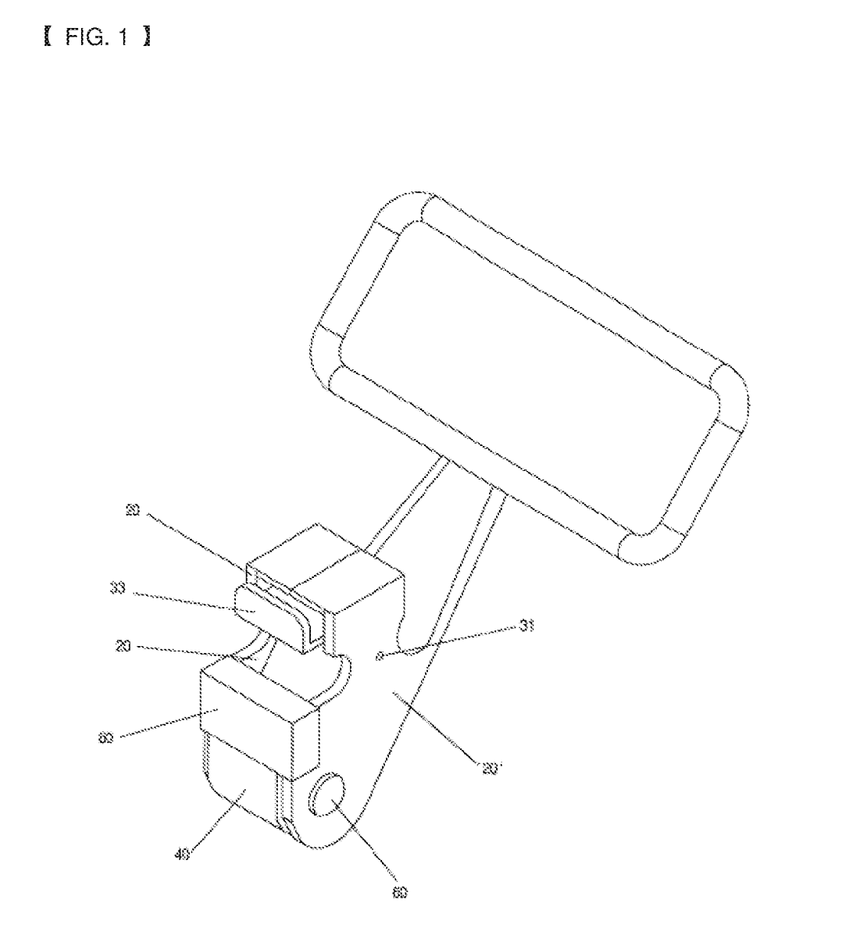
FIG. 1 is a perspective view according to the present invention.
Figure 2:
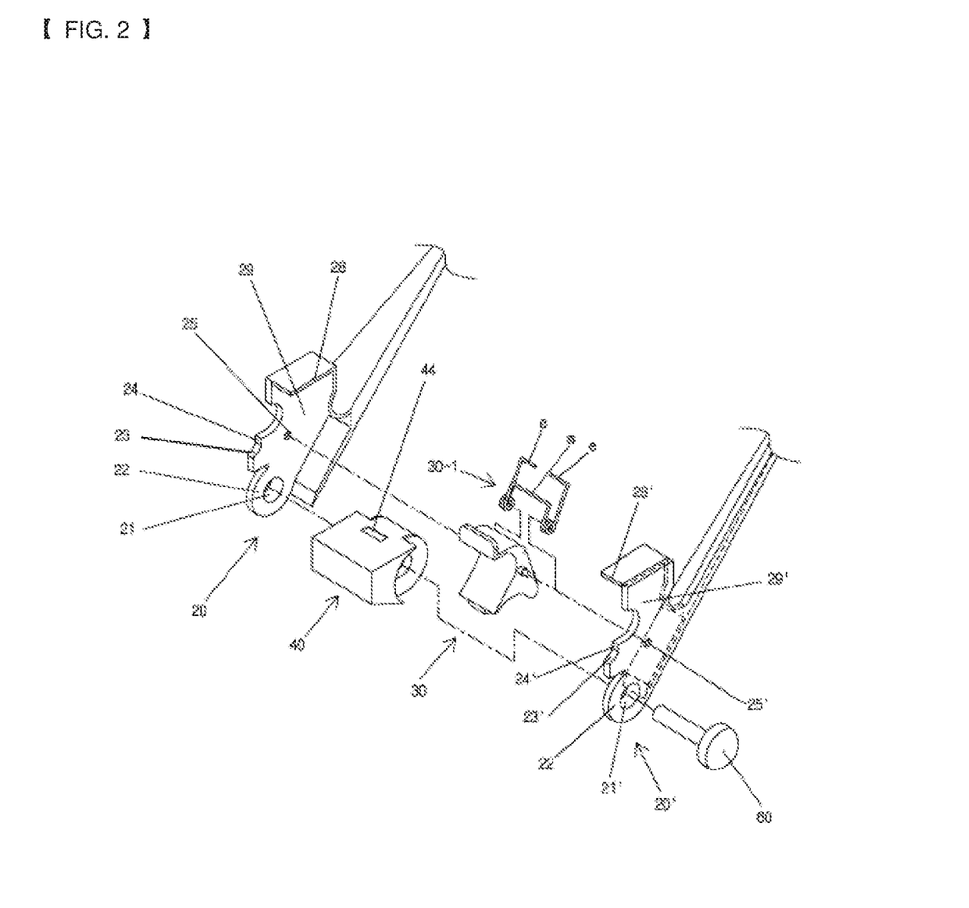
FIG. 2 is an exploded perspective view of a main part according to the present invention.

As shown in FIG. 2, the body 20 and 20' may be formed with an extension part 28 and 28' that protrudes to form a first space part 29 and 29', and the first space portion 29 and 29' may be configured to hold the rotary member 30 and the fixing member 40.

First through hole 21 and 21' of the oval parts 22 and 22' may be formed in the lower portion of the first space portion 29 and 29' such that the fixing member 40 provided with the second washer 49 and 49' may come into surface-contact with the first through hole 21 and 21', and the oval part 22 and 22' may be formed in an oval shape in order to smoothly rotate together with the fixing member 40.

Figure 7:
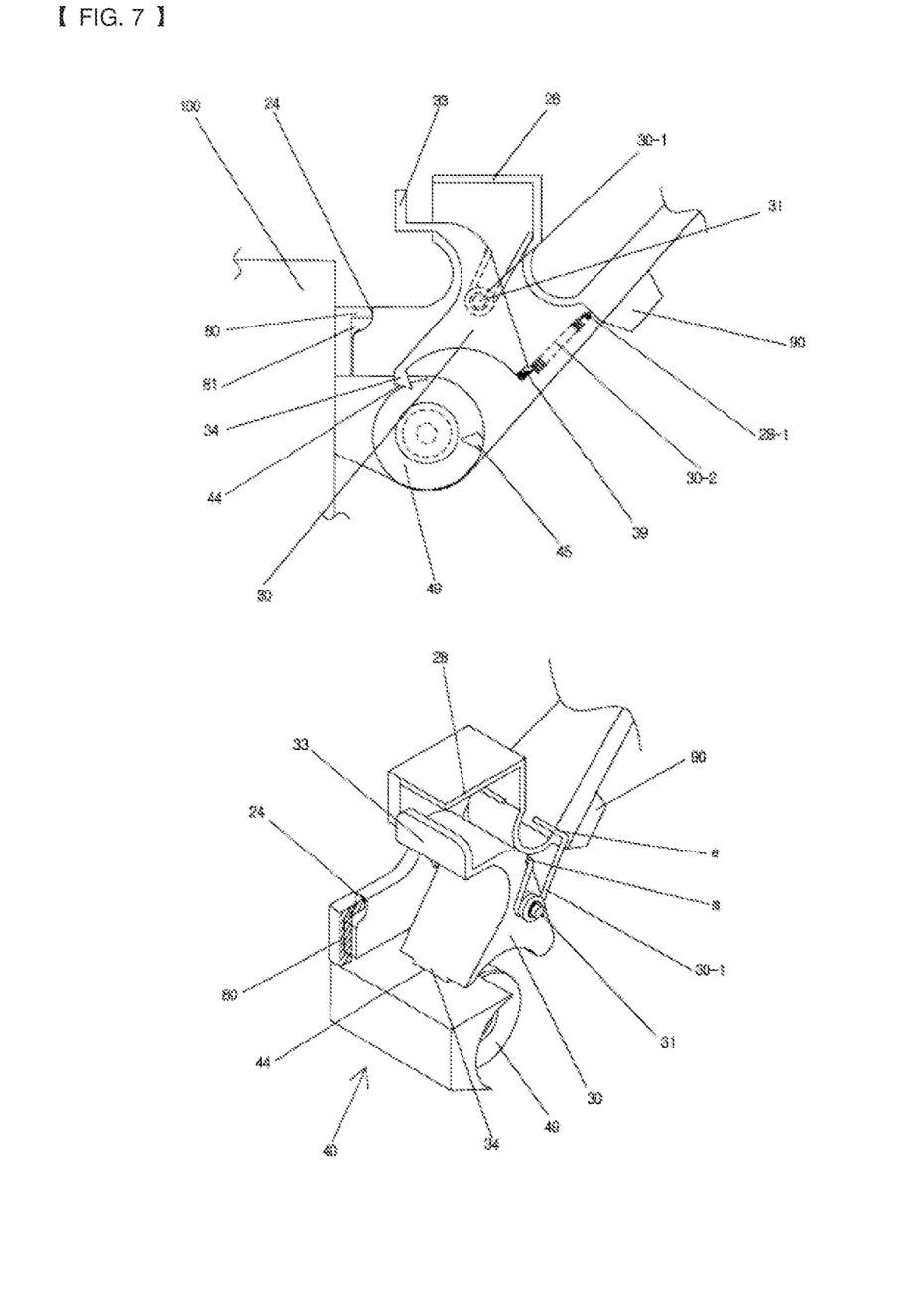
FIG. 7 shows a partially cut-away view and a perspective view showing a state before one embodiment according to the present invention.

An inclined part 23 and 23' and a holding part 24 and 24' may be formed on the upper portion of the oval part 22 and 22'. Thus, as shown in FIG. 7, when the body 20 and 20' is rotated, the body 20 and 20' may be held in a second space part 81 of the holding projection 80 provided in the pot 100 while making surface-contact with the second space part 81, so that an unnecessary space may not be formed. Thus, food broth and food soup cannot permeate so that the durability may be improved. That is, the body 20 and 20' may be safely rotated by minimizing the opening portion using the holding projection 80 and a protruding cover 46 when the body 20 and 20' is rotated.

A second through hole 25 and 25' may be formed inside the holding part 24 and 24', a shaft part 31 of the rotary member 30 may be held in the second through hole 25 and 25', and a head portion of a first elastic member 30-1 may come into surface-contact with a surface contact part 31-1 of the shaft part 31. Meanwhile, a middle portion (m) of the first elastic member 30-1 may be held in a holding groove 38 of the rotary member, and an end portion e thereof may be supported on the inside of the extension part 28 and 28'.

Figure 3:
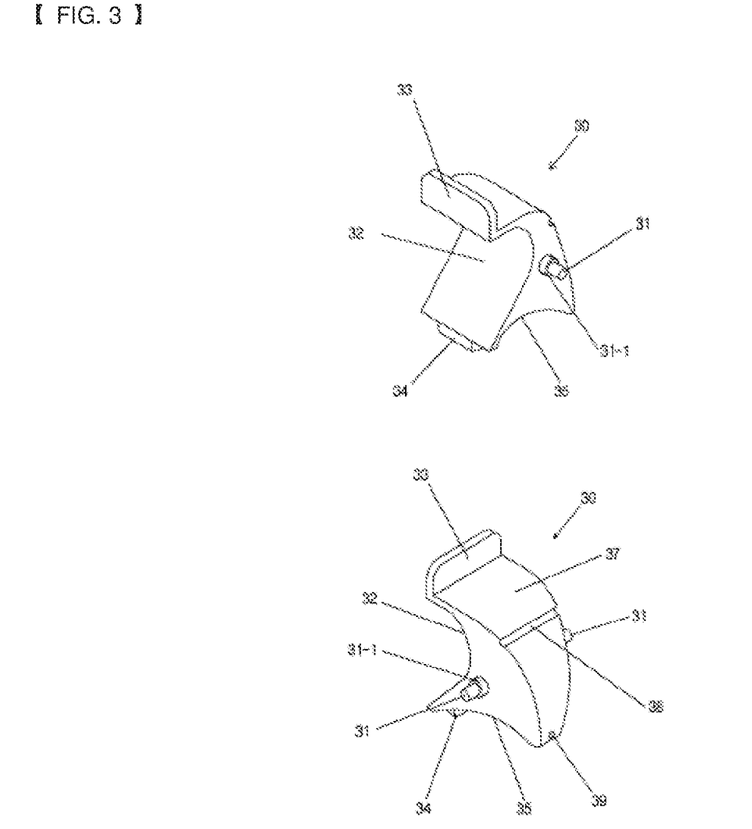
FIG. 3 shows a perspective view and the other side perspective view of a rotary member according to the present invention.

As shown in FIG. 3, the rotary member 30 may have a front bending part 32 on the front surface of the shaft part 31 and a rear bending part 37 on the rear surface of the shaft part 31. Since the front and rear surfaces are bent due to the front bending part 32 and the rear bending part 37, the body 20 and 20' can rotate without interference and the volume and the external shape of the rear bending part 37 may become narrowed in the downward direction so that the space occupied by the body 20 and 20' in the first space part 29 and 29' may be minimized when combined with the body 20 and 20', thereby maximizing the easiness and efficiency in manufacture.

A button 33 may be formed on the upper portion of the front bending part 32. When the button 33 is pressed, a stopper 34 latched with an upper engagement groove 44 of the fixing member 40 may move upward so that the body 20 and 20' may be rotatable. In addition, when the button 33 is not pressed, the stopper 34 does not move upward or downward. The upper engagement groove 44 of the fixing member 40 and the stopper 34 may have a triangular wedge-shaped section, but may also have a rectangular-shaped section.

The stopper 34 may be provided in a bottom bending part 35 formed at a lower portion of the rotary member 30. As described above, in order to allow the stopper to be separated from the upper engagement groove 44 when the button 33 is pressed and to return to its original position when the button 33 is not pressed, a holding groove 38 may be formed at the center of the rear bending part 37 and a middle portion m of the first elastic member 30-1 may be held in the holding groove 38. Meanwhile, a circular coil of the first elastic member 30-1 may be held in a surface-contact part 31-1 of the rotary member 30, and the second elastic member 30-2 may be fixed to the fixing groove 39 formed in the lower portion of the rear bending part 37 and the fixing piece 28-1 formed at the distal end of the extension part 28 and 28'. Thus, when the button 33 is pressed, the body 20 and 20' can rotate about the shaft part 3, and when the button 33 is not pressed, the stopper 34 configured together with the button 33 may return to its original position due to the elasticity of the first elastic member 30-1 and the second elastic member 30-2.

When the rotary member 30 and the body 20 and 20' having the above structure are connected to each other, the shaft part 31 of the rotary member 30 may be connected to the second through hole 25 and 25' of the body 20 and 20' as shown in FIG. 2.

Figure 4:
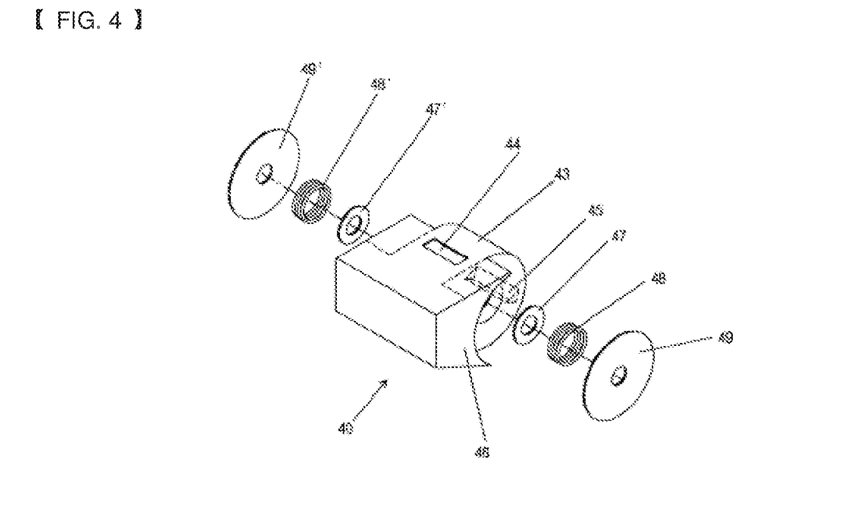
FIG. 4 is an exploded perspective view of a fixing member, a first washer, a second elastic member, and a second washer according to the present invention.
Figure 5:
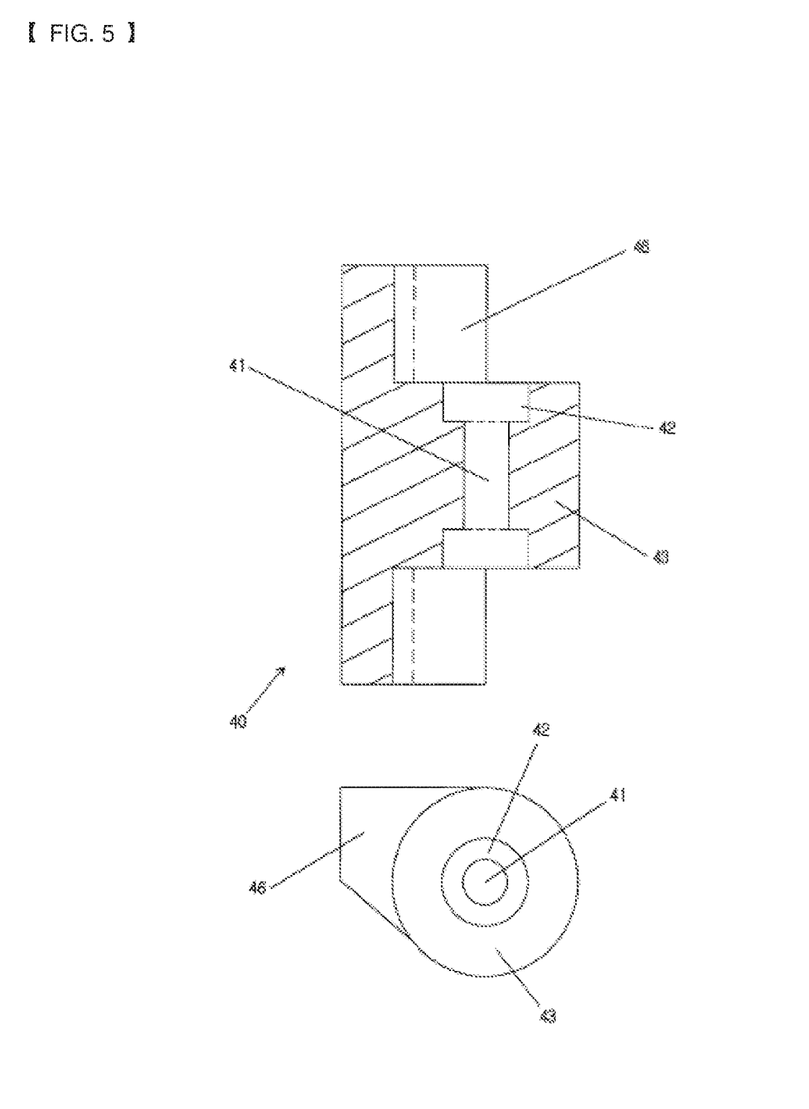
FIG. 5 shows a sectional view and a front view of a fixing member according to the present invention.
Figure 6:
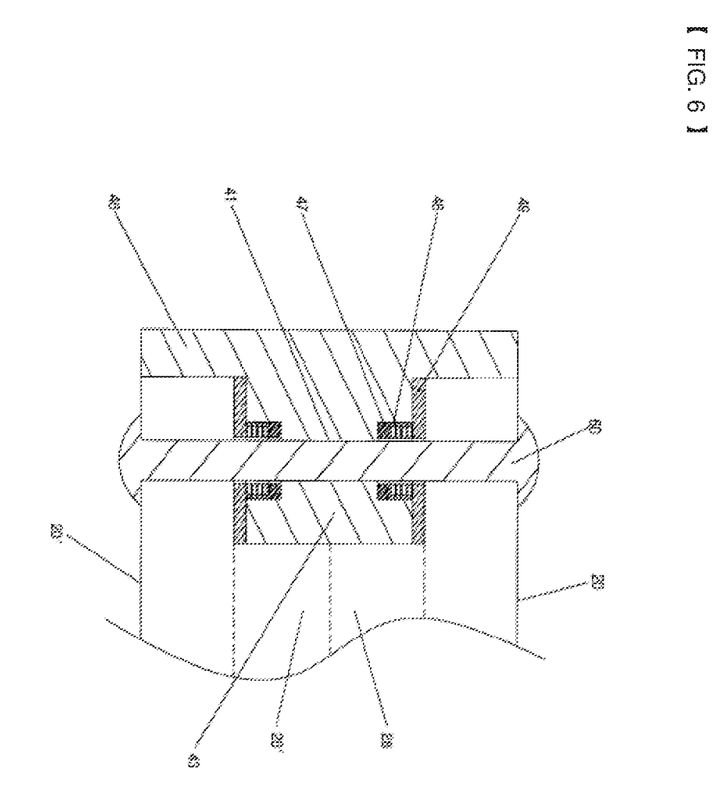
FIG. 6 is a partial cut-away sectional view of a first body and a second body and a fixing member, which are connected by a fixing device according to the present invention.

As shown in FIGS. 4, 5, and 6, the fixing member 40 may be formed at the center thereof with a holding hole 41 and cylindrical parts 43 having the interior space 42 may be formed on both sides of the holding hole 41. The first washer 47 and 47' may be held in the interior space 42, and the third elastic member 48 and 48' and the second washer 49 and 49' may be sequentially mounted on the first washer 47 and 47'. Thus, when combined with the body 20 and 20', the first elastic member 30-1, the second elastic member 30-2, and the third elastic member 48 and 48' may exert strong elasticity, thereby performing the second stopper function when used as the pot handle and the stand.

Figure 11:
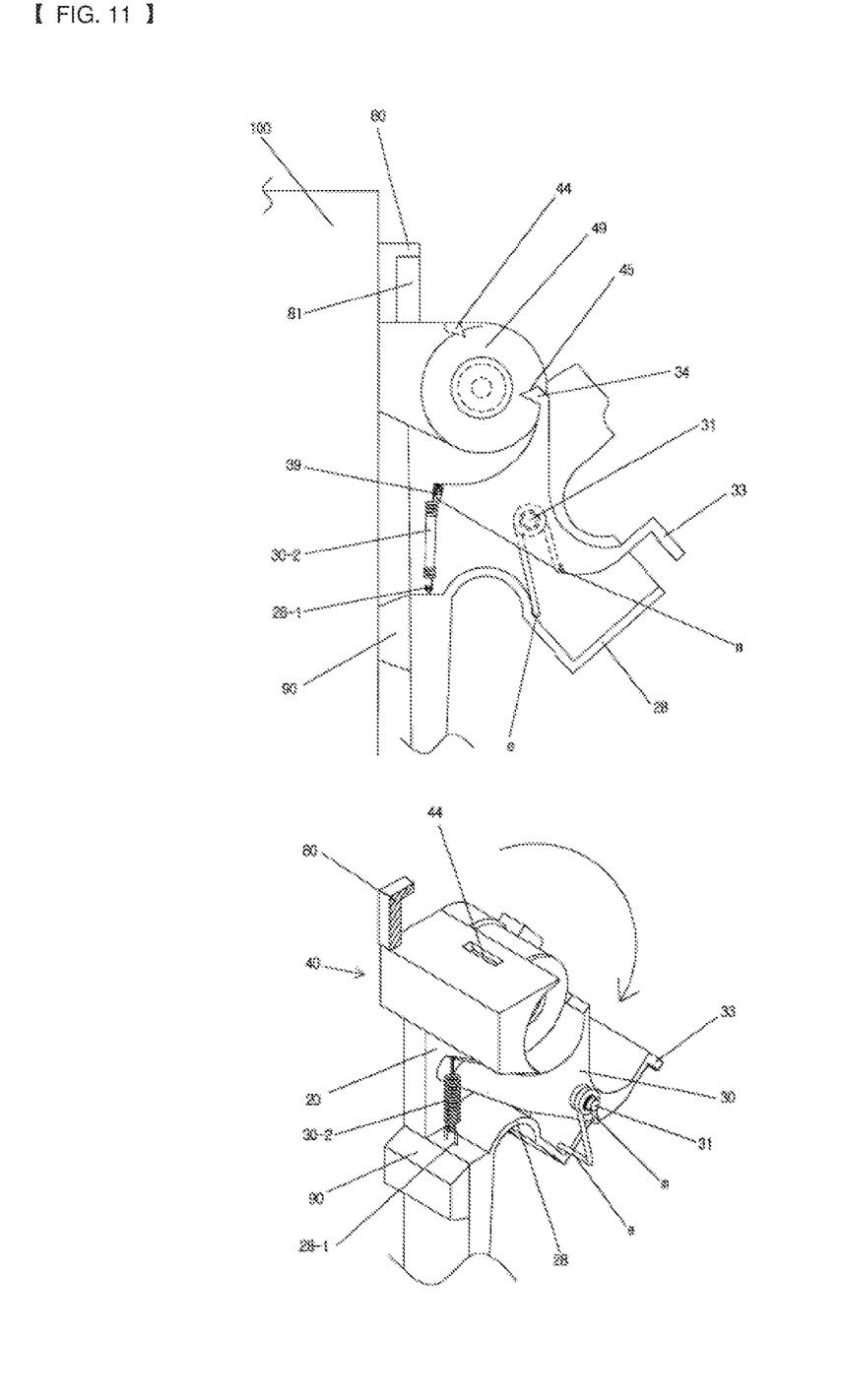
FIG. 11 shows a partially cut-away view and a perspective view showing a state after one embodiment according to the present invention.
Figure 12:
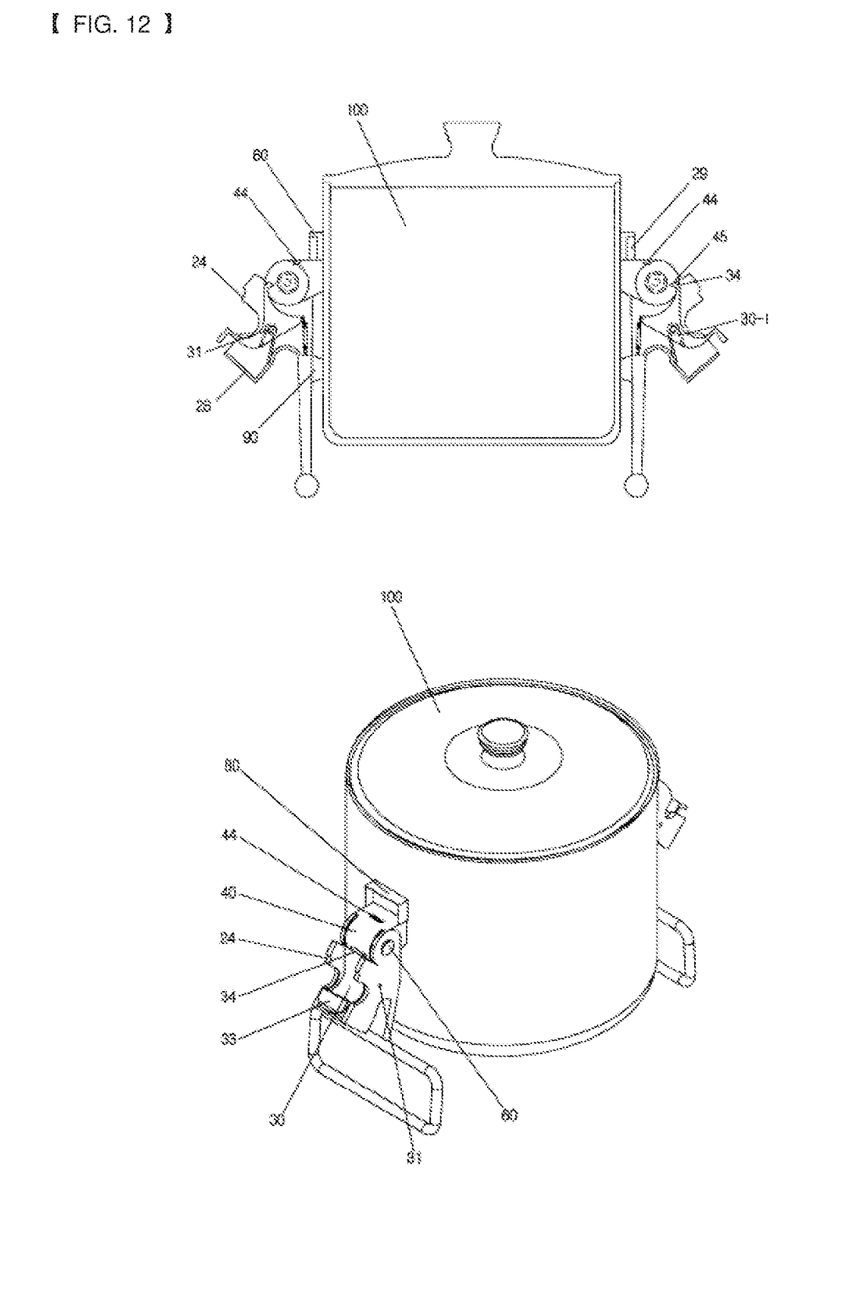
FIG. 12 shows a sectional view and a perspective view of one embodiment of FIG. 11.

A protruding cover 46 may be formed on the outer circumferential surface of the cylindrical part 43, so that the body 20 and 20' can be securely mounted when it is mounted, and the portion which is exposed during the rotation can be minimized as shown in FIG. 11 so that it can be used efficiently.

Figure 8:
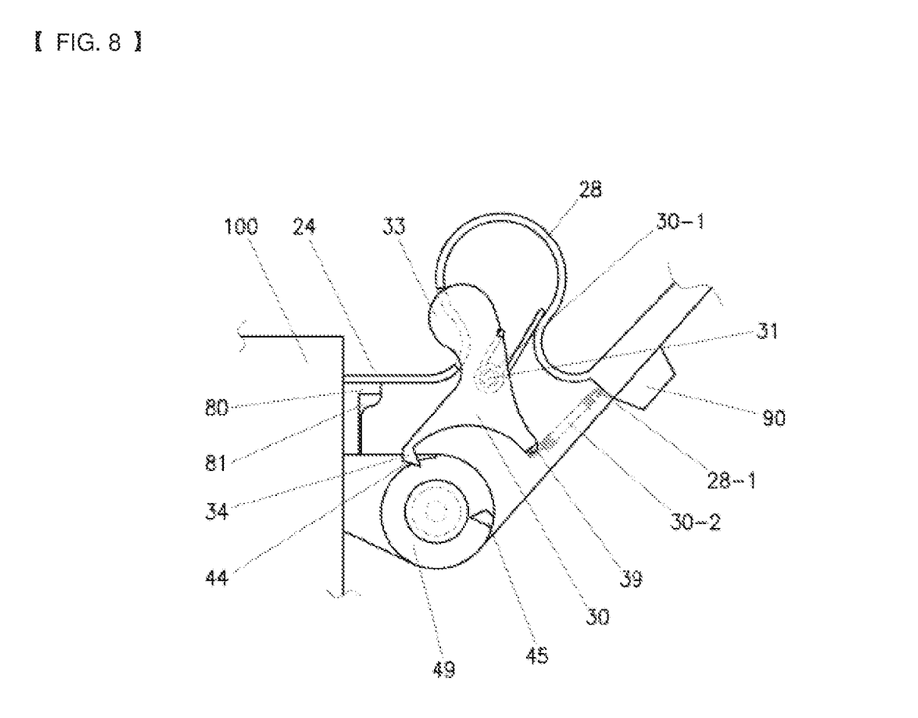
FIG. 8 is a sectional view showing a modified shape of a fixing member according to the present invention.

As shown in FIG. 8, the fixing member 40 may be formed in a shape of a curved line with a good feel of grip.

Figure 9:
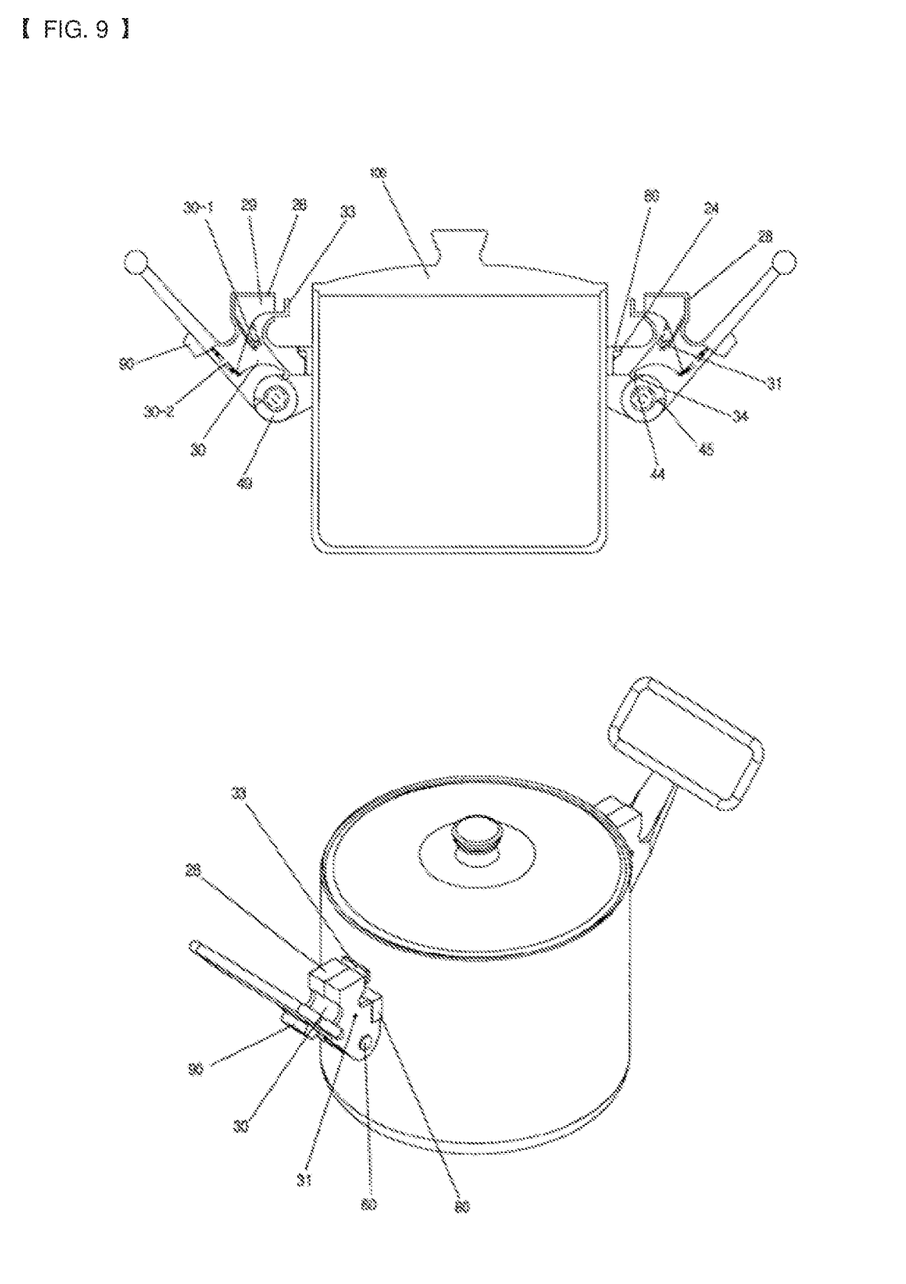
FIG. 9 shows a sectional view and a perspective view of one embodiment of FIG. 7.

Hereinafter, an embodiment of the present invention will be described in detail with reference to accompanying drawings. As shown in FIG. 7, if the button 33 is not pressed, the rotary member 30 may not rotate, the stopper 34 held in the upper engagement groove 44 may not also rotate upward or downward, the second elastic member 30-2 fixed to the fixing groove 39 formed in rotary member 30 and the fixing piece 28-1 formed at the distal end of the extension part 28 and 28' may return to its original position, and the holding part 24 and 24' of the body 20 and 20' may be attached to the pot 100 while making surface-contact with the holding projection 80, so that the rotary member 30 may not rotate. This formation is an embodiment used as a pot handle as shown in FIG. 9.

Figure 10:
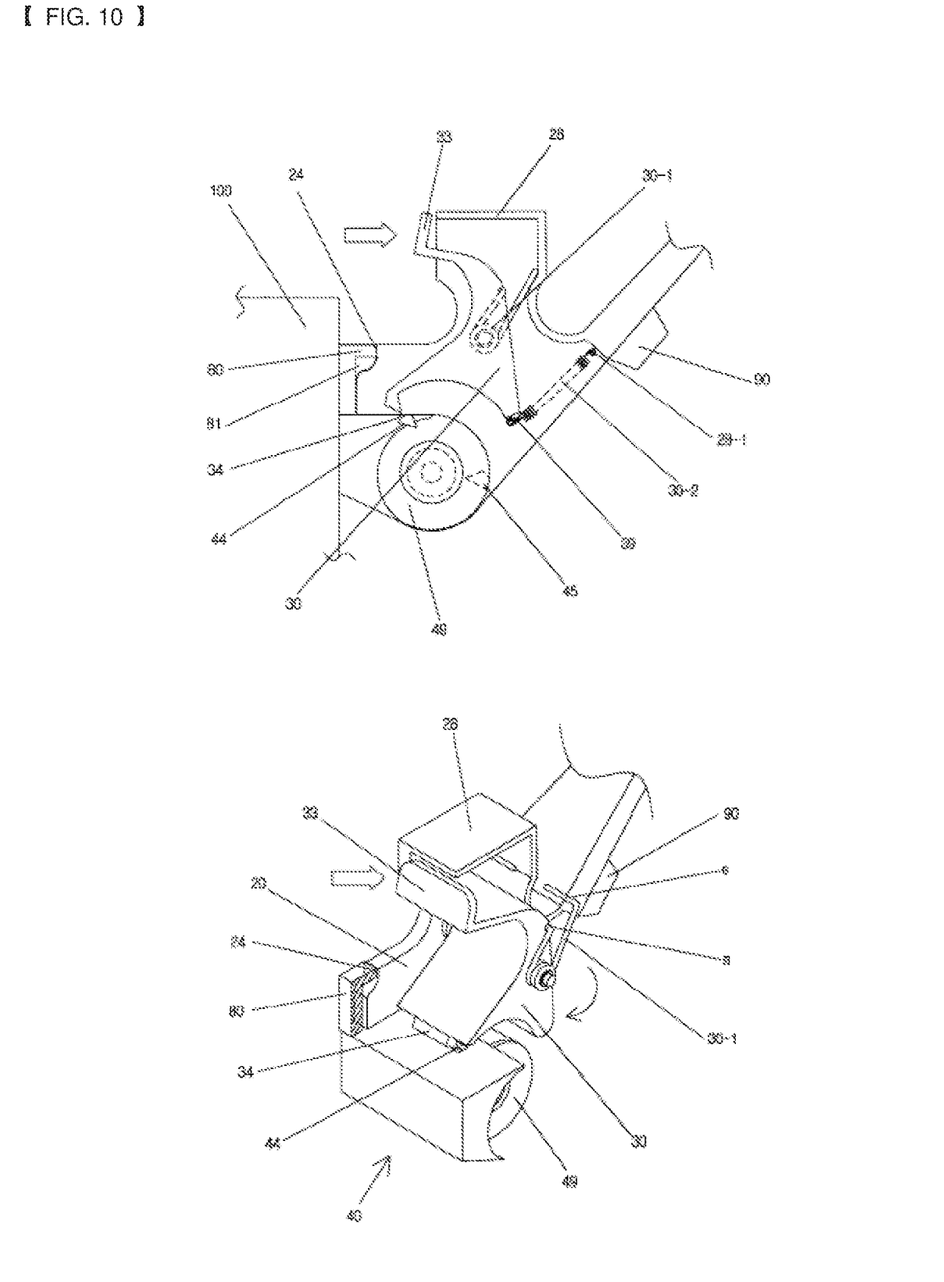
FIG. 10 shows a partially cut-away view and a perspective view when a button is pressed according to the present invention.

As shown in FIG. 10, when the button 33 is pressed, the body rotates about the shaft part 31 of the rotary member 30, so that the stopper 34 held in the upper engagement groove 44 may be separated from the upper engagement groove 44 and moved upward. In this case, the second elastic member 32, which is fixed to the fixing groove 39 of the rotary member 30 and the fixing piece 28-1 provided at the distal end of the extension part 28 and 28' may be elongated, and the body 20 and 20' may be freely rotatable about the shaft part 31 of the rotary member 30.

When the head of the extension part 28 and 28' of the body 20 and 20' is rotated in a state in which the button 33 is pressed as shown in FIG. 11, the head may be rotated about the shaft part 31 of the rotary member 30 and caught in a lower engagement groove 45 formed at the lower portion of the cylindrical part 43. In this case, the second elastic member 30-2 fixed to the fixing groove 39 formed in the rotary member 30 and the fixing piece 28-1 formed at the distal end of the extension part 28 and 28' may return to its original position. Therefore, as shown in FIG. 11, the pot handle can be used as a stand.

In addition, the lateral movement prevention member 90 may be formed on the outer diameter portion of the bottom surface of the fixing piece 28-1. When using the pot handle as a stand, the lateral movement prevention member may minimize the shaking in the left and right direction to firmly fix the pot, and the rotation range of the rotary member may be limited to safely use the stand. The lateral movement prevention member 90 may be formed of a material that can minimize the thermal conductivity to prevent the injury such as burns by diminishing the heat conducted from the pot.

As described above, although the stand for an easily foldable rotary stand used as a pot handle according to an embodiment of the present invention is illustrated according to the description and drawings, this is merely an example and it will be well understood by those skilled in the art that various changes and modifications can be made without departing from the technical scope of the present invention.

The invention claimed is:

1. An easily foldable rotary stand used as a pot handle, comprising:
   a body provided at a lower portion thereof with an oval part having a first through hole, in which an inclined part and a holding part are provided at an upper portion of the oval part, so the body is rotated by the inclined part without being interfered with by a holding projection, the holding part comes into surface-contact with a distal end of the holding projection so that the holding part is firmly fixed when used as a pot handle, a second through hole is provided inside the holding part, an extension part protrudes inward at an upper portion of the body to form a first space part, a fixing piece is provided at a distal end of the extension part, and a lateral movement preventing member is formed on an outer diameter portion of a bottom surface of the fixing piece;
   a rotary member with a shaft part having a surface-contact part and passing through a center of the rotary member to be exposed, in which a front bending part is formed on a front part of the shaft part, a button is formed to protrude vertically from an upper portion of the rotary member, a stopper is provided at a lower portion of the rotary member, a bottom bending part is formed on a rear surface of the stopper, a rear bending part narrowing downward is formed on a rear surface of the front bending part, a holding groove is formed at a center of the rear bending part, and a fixing groove is integrally formed at a lower portion of the rotary member; and
   a fixing member having a first elastic member with a middle portion held in the holding groove of the rotary member, in which a distal end of the first elastic member is held inside the extension part of the body, a second elastic member is fixed to the fixing groove of the rotary member and the fixing piece provided at the distal end of the extension part, so that the fixing member rotates about the shaft part when the button of the rotary member is pressed and the fixing member returns to an original position when the button is not pressed, a holding hole is formed at a center of the fixing member, cylindrical parts having an interior space wider than a diameter of the holding hole are provided at both sides of the fixing member, an upper engagement groove and a lower engagement groove are formed on an upper surface and a lower part of the cylindrical part, respectively, protruding covers protrude from opposite sides of the fixing member, and a first washer, a third elastic member, and a second washer are sequentially held in the interior space,
   wherein a holding projection having a second space is formed on an upper portion of the fixing member, the fixing member and the holding projection are integrally or separately formed and detachably attached to upper left and right portions of a pot, and the second washer of the fixing member is fixed by a fixing device after making surface-contact with the first through hole of the body.

\* \* \* \* \*